United States Patent [19]

Shimizu

[11] Patent Number: 5,657,048
[45] Date of Patent: Aug. 12, 1997

[54] IMAGE PROCESSING APPARATUS

[75] Inventor: Haruo Shimizu, Yokohama, Japan

[73] Assignee: Canon Kabushiki Kaisha, Tokyo, Japan

[21] Appl. No.: 487,699

[22] Filed: Jun. 7, 1995

Related U.S. Application Data

[63] Continuation of Ser. No. 156,978, Nov. 24, 1993, abandoned, which is a continuation of Ser. No. 754,376, Aug. 30, 1991, abandoned, which is a continuation of Ser. No. 393,811, Aug. 14, 1989, abandoned, which is a continuation of Ser. No. 914,199, Oct. 1, 1986, abandoned.

[30] Foreign Application Priority Data

Oct. 3, 1985 [JP] Japan ................... 60-219223

[51] Int. Cl.$^6$ .................................................. G09G 5/34
[52] U.S. Cl. ................... 345/143; 358/444; 395/110
[58] Field of Search ................... 340/720, 723, 340/732, 735, 748, 750, 790; 345/10, 141, 143, 185, 192, 194, 195; 358/404, 444; 400/120, 121, 126, 171; 395/110

[56] References Cited

U.S. PATENT DOCUMENTS

| | | | |
|---|---|---|---|
| 4,081,604 | 3/1978 | Kanaiwa . | |
| 4,199,815 | 4/1980 | Kyte et al. | 340/750 |
| 4,316,188 | 2/1982 | Cancasci, Jr. | 340/732 |
| 4,325,063 | 4/1982 | Herman | 340/750 |
| 4,408,197 | 10/1983 | Komatsu et al. | 340/750 |
| 4,451,825 | 5/1984 | Hall et al. | 340/750 |
| 4,686,525 | 8/1987 | Nagata | 340/735 |
| 4,695,835 | 9/1987 | Bugg | 340/735 |
| 4,712,188 | 12/1987 | Nishiyama | 340/750 |
| 4,715,006 | 12/1987 | Nagata . | |
| 4,763,281 | 8/1988 | Arakawa | 340/735 |
| 4,814,892 | 3/1989 | Igarashi | 340/790 |
| 4,837,712 | 6/1989 | Shibamiya | 364/523 |
| 4,843,593 | 6/1989 | Yanaru et al. | 340/735 |

FOREIGN PATENT DOCUMENTS

| | | |
|---|---|---|
| 0121126 | 10/1984 | European Pat. Off. . |
| 2553208 | 4/1985 | France . |
| 3436033 | 4/1985 | Germany . |
| 3509206 | 9/1985 | Germany . |

OTHER PUBLICATIONS

Patent Abstracts of Japan, vol. 8, No. 6 (P–247), Jan. 12, 1984 & JP-A-58 169236 (Tokyo Shibaura Denki K.K.) Oct. 5, 1983.

*Primary Examiner*—Richard Hjerpe
*Assistant Examiner*—Kara Farnandez Stoll
*Attorney, Agent, or Firm*—Fitzpatrick, Cella, Harper & Scinto

[57] ABSTRACT

An image processing apparatus capable of generating characters in various fonts has a replaceable first character generator and a second character generator. Frequently used characters are transferred from the former and registered in the latter, so that various fonts can be used without changing the character generator.

20 Claims, 9 Drawing Sheets

|   | 0 | 1 | 2 | 3 | 4 | 5 | 6 | 7 |
|---|---|---|---|---|---|---|---|---|
| 0 |   |   |   | 0 | @ | P | ` | p |
| 1 |   |   | ! | 1 | A | Q | a | q |
| 2 |   |   | " | 2 | B | R | b | r |
| 3 |   |   | # | 3 | C | S | c | s |
| 4 |   |   | $ | 4 | D | T | d | t |
| 5 |   |   | % | 5 | E | U | e | u |
| 6 |   |   | & | 6 | F | V | f | v |
| 7 |   |   | ' | 7 | G | W | g | w |
| 8 |   |   | ( | 8 | H | X | h | x |
| 9 |   |   | ) | 9 | I | Y | i | y |
| A |   |   | * | : | J | Z | j | z |
| B |   |   | + | ; | K | [ | k | { |
| C |   |   | , | < | L | ¥ | l | \| |
| D |   |   | - | = | M | ] | m | } |
| E |   |   | . | > | N | ^ | n | ‾ |
| F |   |   | / | ? | O | _ | o |   |

| CHAR PATTERN SET ID (601) | CHAR PATTERN SET HEAD ADDRESS (602) | CARTRIDGE TYPE RAM(INTERNAL) ROM(INTERNAL) (603) |
|---|---|---|
| | | |
| | | |
| ⋮ | ⋮ | ⋮ |
| | | |
| | | |
| | | |
| | | |

FIG. 11A
REGULAR TYPE

0123456789ABCDEFGHIJKLMNOPQRSTUVWXYZ!@#$%^&*()_+[]{

FIG. 11B
ITALIC TYPE

*0123456789ABCDEFGHIJKLMNOPQRSTUVWXYZ!@#$%^&*()_+[]{*

FIG. 11C
BOLDFACE TYPE

0123456789ABCDEFGHIJKLMNOPQRSTUVWXYZ!@#$%^&*()_+[]{

FIG. 12

IMAGE PROCESSING APPARATUS

This application is a continuation of application Ser. No. 08/156,978, filed Nov. 24, 1993, now abandoned, which was a continuation of application Ser. No. 07/754,376, filed Aug. 30, 1991, now abandoned, which was a continuation of application Ser. No. 07/393,811, filed Aug. 14, 1989, now abandoned, which was a continuation of application Ser. No. 06,914,199, filed Oct. 1, 1986, now abandoned.

BACKGROUND OF THE INVENTION

1. Field of the Invention

The present invention relates to an image processing apparatus equipped with pattern generating means.

2. Related Background Art

Most of the conventional printing apparatus capable of generating plural different patterns, other than those utilizing mechanical typefonts, perform printing operation by converting character code data, supplied from a host computer, into dot patterns of corresponding output characters stored in advance.

Such principle is employed for example in thermal printers, wire dot printers, laser beam printers etc.

In such printers the characters of different styles, such as Italic or bold style, can be printed by utilizing character pattern generators for respectively different type fonts, and such character generators are often incorporated in printers designed for a limited number of characters, for example alpha-numeric printers.

More recently, a read-only memory (ROM) or a random access memory (RAM) constituting such character pattern generator is formed as a cartridge, and such cartridge is detachably mounted on a socket provided on the printing apparatus.

Such structure not only allows the user to arbitrarily select the type style, thus widening the field of application of such apparatus, but also the manufacturer need not endlessly expand the character pattern generator incorporated in the printing apparatus.

However, in a case in which the apparatus is used by plural users or in case the recording of a page contains various type styles, it has been necessary to exchange the cartridges frequently, since a cartridge can only store a limited number of type styles.

Also the recording with a designated type style cannot be obtained if the exchange of the cartridge is neglected.

Such drawbacks can be prevented by mounting plural cartridges at the same time, but such structure will lead to a higher manufacturing cost.

SUMMARY OF THE INVENTION

An object of the present invention is to eliminate the above-explained drawbacks.

Another object of the present invention is to provide an improvement in an image processing apparatus equipped with pattern generating means.

Still another object of the present invention is to provide an inexpensive image processing apparatus capable of generating desired patterns.

Still another object of the present invention is to provide an image processing apparatus capable of generating a desired image with excellent operability.

Still another object of the present invention is to provide an image processing apparatus capable of generating a desired image with improved functions.

Still another object of the present invention is to provide an image processing apparatus equipped with pattern generating means of improved efficiency.

Still another object of the present invention is to provide an image processing apparatus of a high reliability.

The foregoing and still other objects of the present invention will become fully apparent from the appended claims and the following description to be taken in conjunction with the attached drawings.

DETAILED DESCRIPTION OF THE PREFERRED EMBODIMENTS

Now the present invention will be clarified in greater detail by an embodiment thereof shown in the attached drawings.

Figure 1:
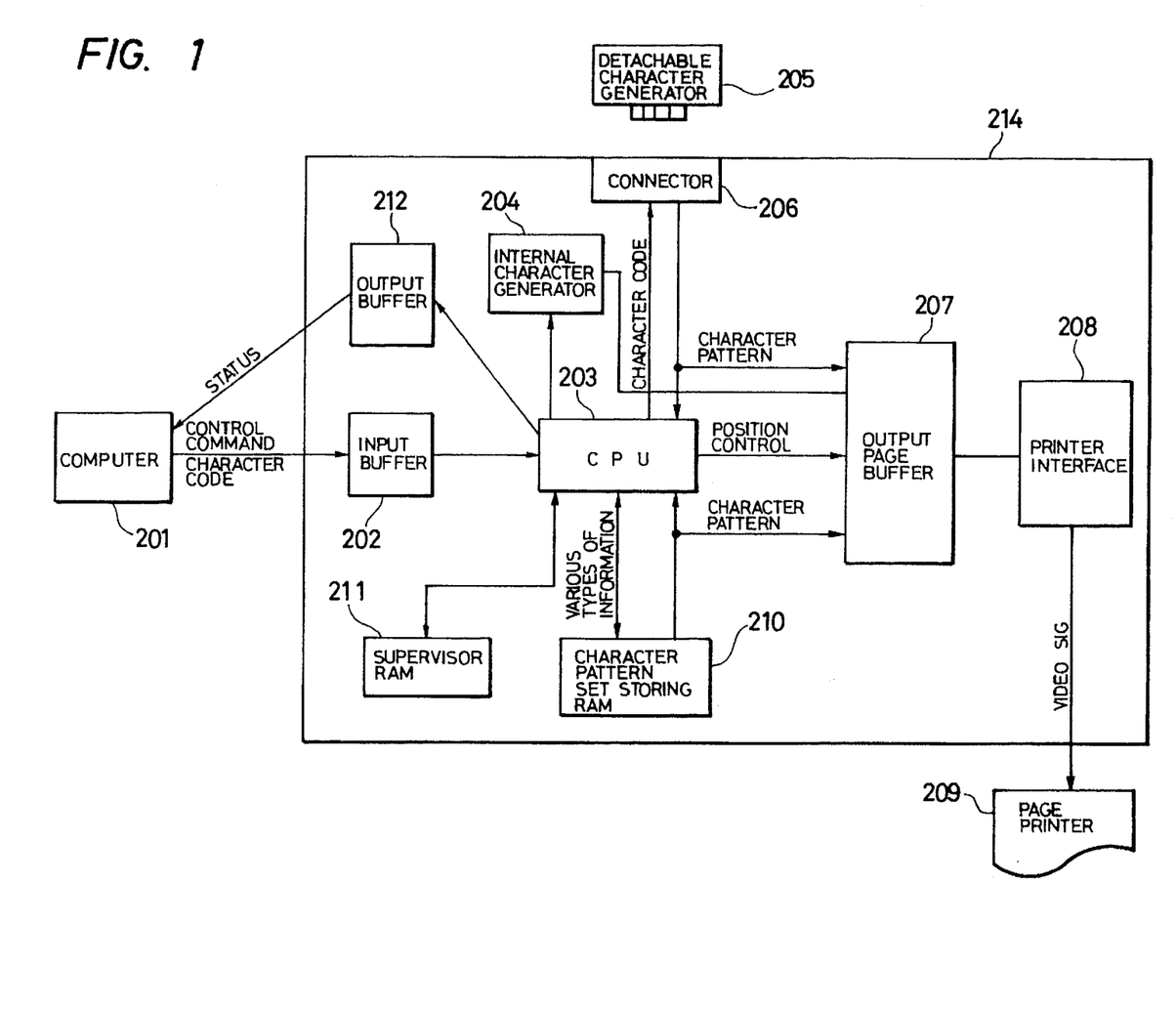
FIG. 1 is a block diagram of a control circuit for character pattern generation according to the present invention.

FIG. 1 shows a control circuit for character pattern generation in an embodiment of the present invention, utilized for recording character patterns with a page printer such as a laser beam printer, in response to character code data and control commands supplied from a host computer 201.

In FIG. 1, there are shown a host computer 201 for generating character code data and control commands; an input buffer 202 for temporarily storing character code data and control commands; an output buffer 212 for latching the output of a central processing unit (CPU) 203 for transmitting the status of an image output device, including a page printer 209, to the host computer 201; a central processing unit (CPU) 203 composed of a general-purpose microprocessor; an incorporated character generator 204 for generating character dot patterns in response to character code data; a cartridge-shaped detachable character generator 205; a socket 206 for connecting said character generator 205; a random access memory (RAM) 210 for copying the character dot patterns of the character generators 205, 204 or of said RAM; an output page buffer 207 composed of a semiconductor RAM having a capacity corresponding to the number of dots in a page; a supervisor RAM 211 for storing information on a registered character pattern set; a printer interface 208 functioning as an interface with the printer and generating a video signal according to the dot pattern to be printed, stored in the output page buffer; a page printer 209 such as a laser beam printer, for recording an image according to the video signal from the printer interface 208; and a CPU board 214 on which the foregoing units are mounted, with the exception of the page printer 209 and the host computer 201.

In the following there will be explained in detail the function of the circuit shown in FIG. 1

Figure 2:
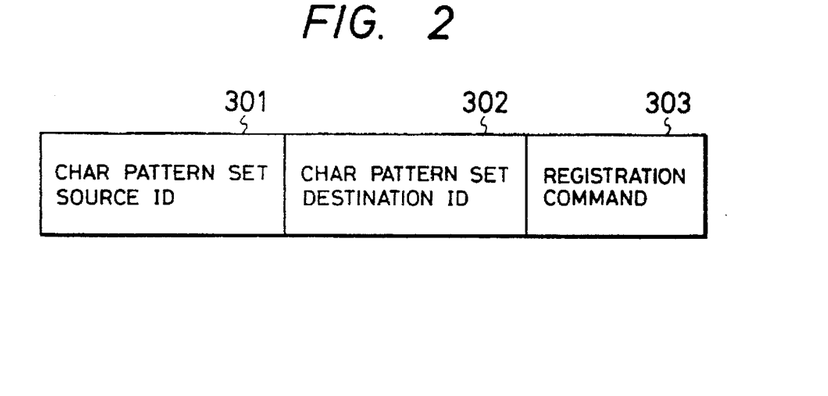
FIG. 2 is a schematic view of a format of a copying command for a character pattern set employed in an embodiment of the present invention.

In FIG. 1, the character code data (image information) and the copy command for character pattern set supplied from the host computer 201 are temporarily stored in the input buffer 202. In the present embodiment, a command for the character pattern set is constructed as shown in FIG. 2, and is composed of a source ID 301 (identification number of a character pattern set to be copied), a destination ID 302 (identification number of a new character pattern set formed by copying) and a registration command 303. Thus a character pattern set, indicated by the source ID 301, is copied and registered as a character pattern set indicated by the destination ID 302.

In the following there will be explained the data structure of said character pattern set.

Figure 3:
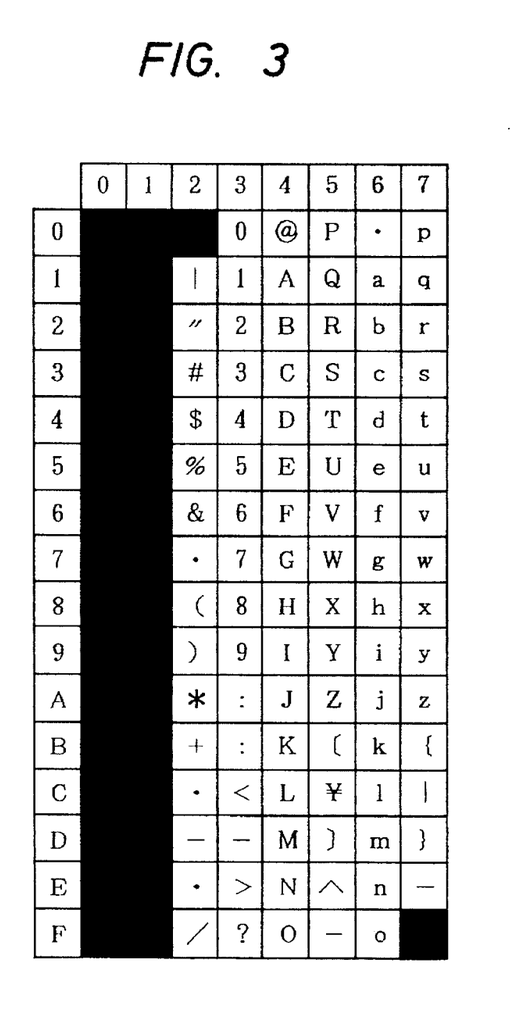
FIG. 3 is a chart showing a character code system for alphabetic characters.

The code system for alphanumeric printing for example has a structure as shown in FIG. 3 wherein characters and symbols are represented by codes 21 to 7E. In this example each code is represented by hexadecimal representation. In the following description "character" is assumed to include symbols and patterns.

Figure 4:
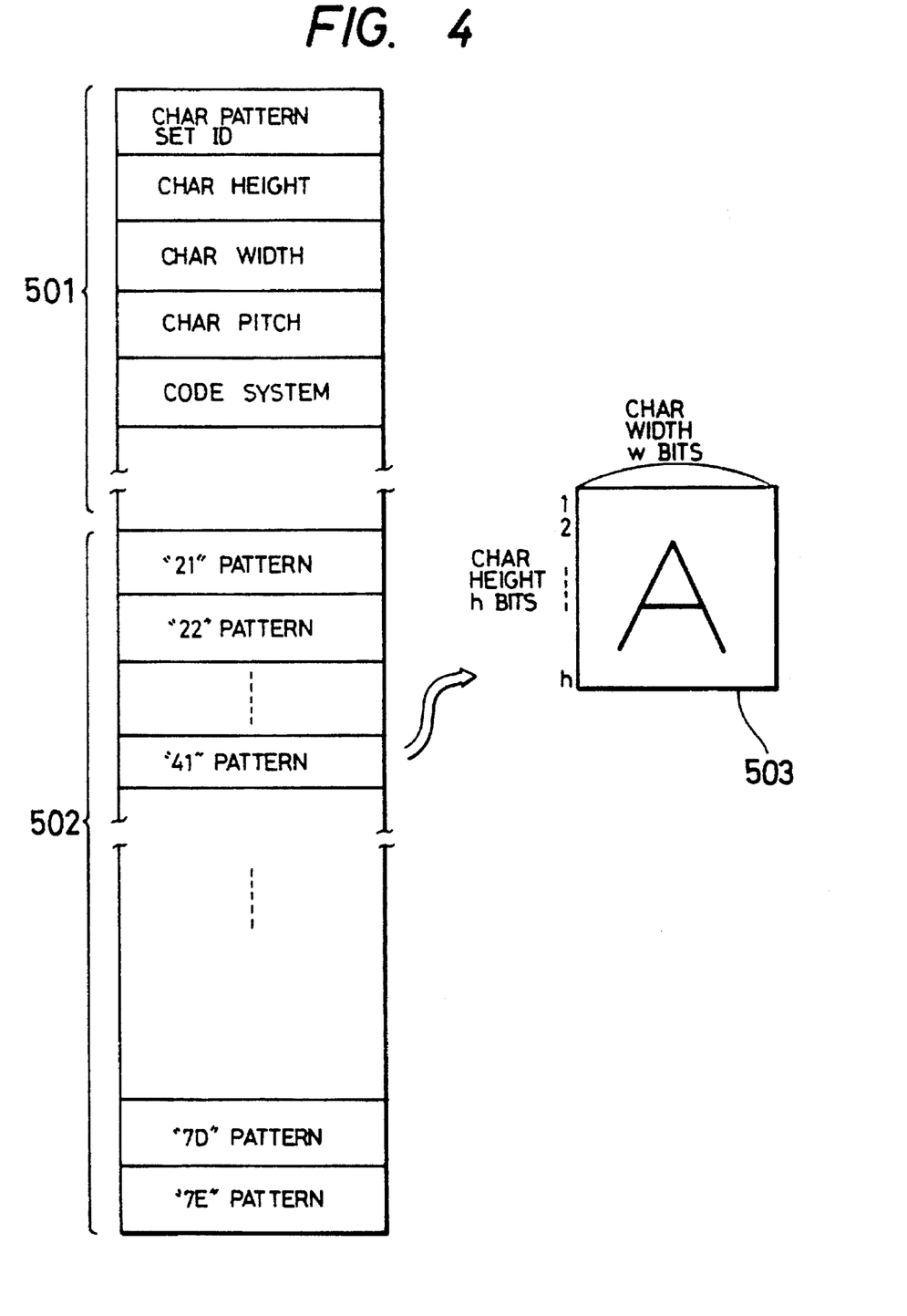
FIG. 4 is a chart showing the structure of a character pattern set.

In the present embodiment, the character pattern set is stored in a memory such as a RAM or a ROM, for example in a structure as shown in FIG. 4. The character pattern set is composed of a character pattern set information portion 501 and a character pattern portion 502, in which dot patterns corresponding to the codes 21-7E are stored in a designated size. Information on a character set (codes 21-7E) is stored in the character pattern set information portion 501, and includes the character pattern set ID number, character height, character width, character pitch, code system (7-bit or 8-bit system), etc.

The size of each character or symbol in the character pattern portion 502 is indicated in the character pattern set information portion 501, and is defined as (character height) ×(character width)/8 bytes. Each character, for example a character "A" corresponding to a code "41", is represented by a dot matrix 503 of a size designated by the character height and character width stored in the character pattern set information portion 501, and is stored in the RAM or ROM in the units of 8 bits, starting from the left-hand end of a line 1 in the dot matrix 503.

The character pattern set information portion 501 has a fixed capacity of 2 bytes, but the character pattern portion 502 has a variable capacity according to the code system, such as a 7-bit, 8-bit or 2-byte system.

Figure 5:
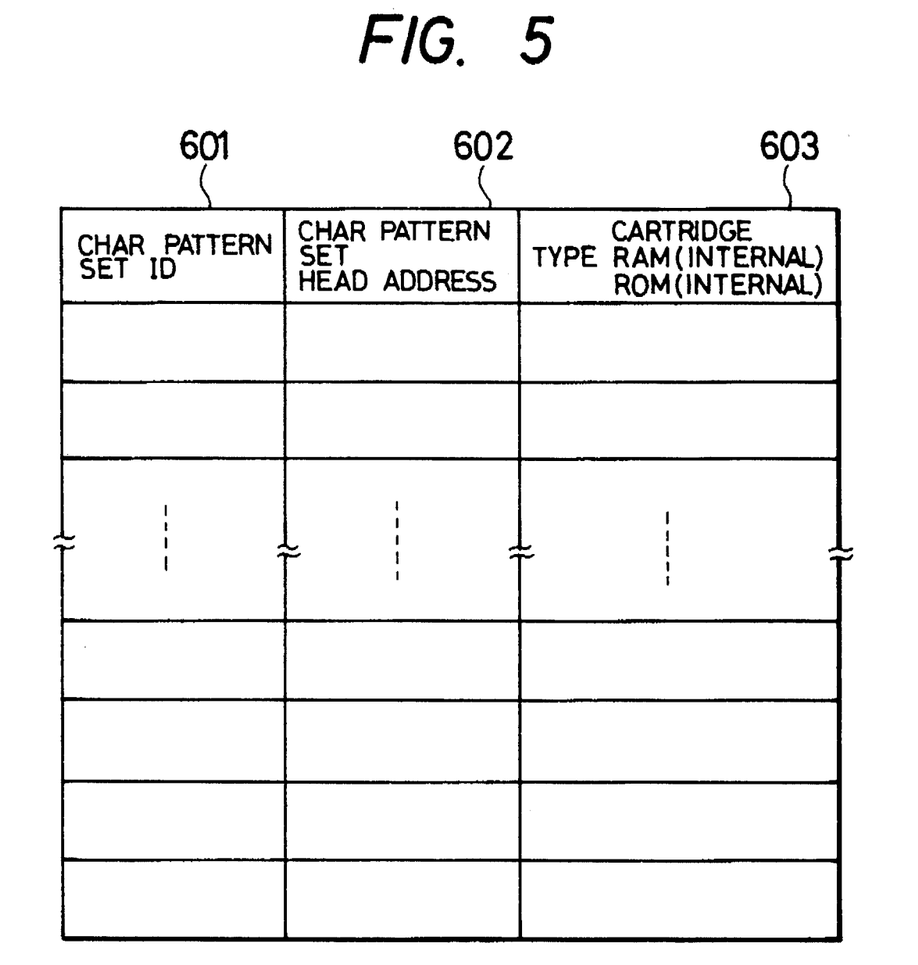
FIG. 5 is a chart showing a supervisor pattern table.

In the present embodiment, in order to supervise such character pattern set, a supervisor RAM 211 is employed for preparing a supervisor pattern table as shown in FIG. 5.

The supervisor pattern table stores the following three items for a character pattern set. The first item is a character pattern set ID number 601, which is utilized in registering the character pattern set, or in determining the type style by designating a character pattern set. The second item is a leading address 602, indicating the leading address of the character pattern set information portion 501. The third item indicates type 603 of medium in which the character pattern set is present.

Thus this item indicates whether the character pattern set, indicated by the character pattern set ID 601, is present in the internal character generator ROM 204, RAM 210 for registration or cartridge 205.

Figure 6:
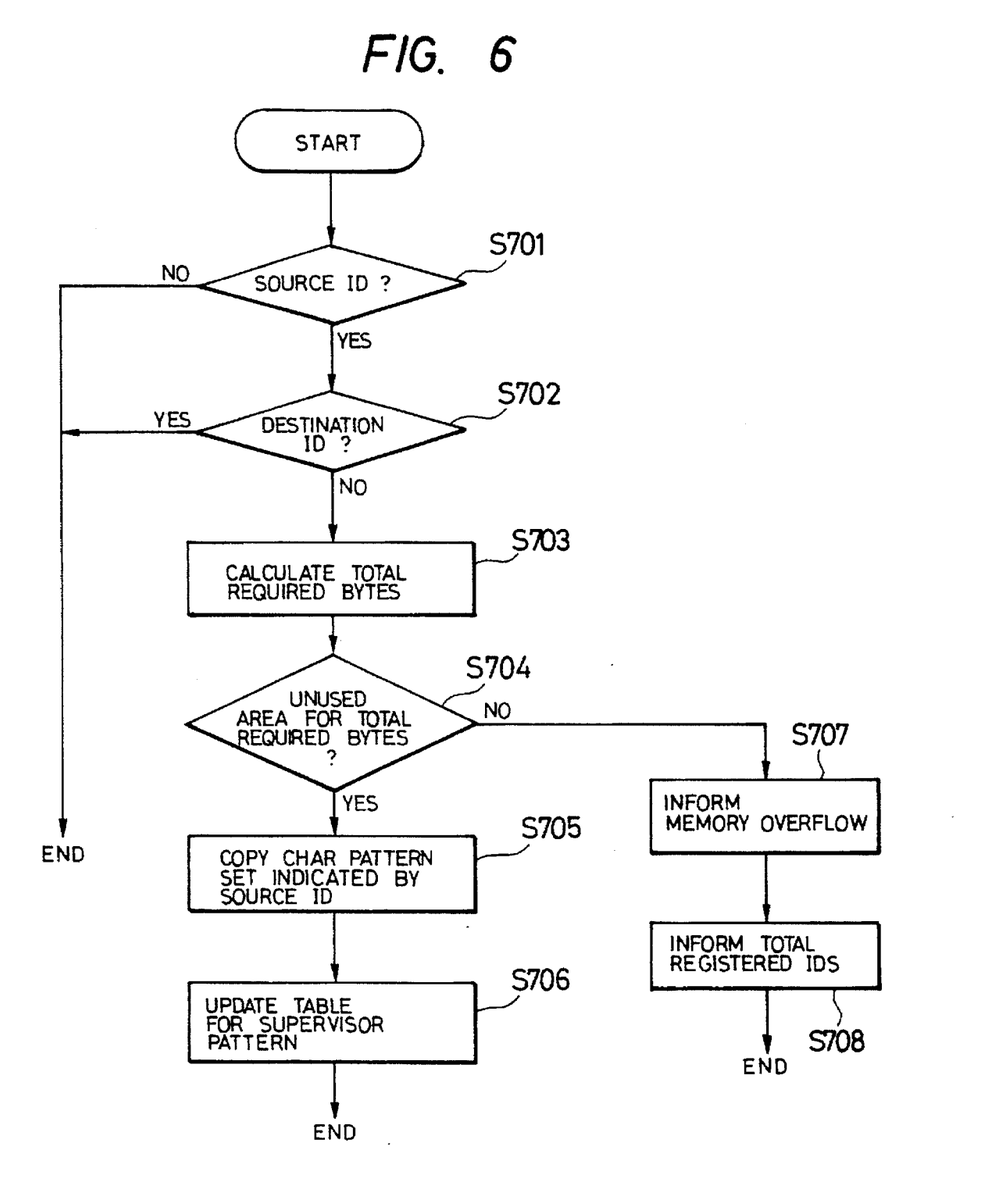
FIG. 6 is a flow chart showing a copy registration process of a character pattern set in said embodiment.

Now reference is made to FIG. 6 for explaining the procedure of copy/registration of the character pattern set. A program corresponding to said procedure is stored in a ROM in the CPU 203 and executed by said CPU 203. The ROM also stores programs corresponding to the flow chart shown in FIGS. 8 and 9.

In the present embodiment, a character pattern set of a type style stored for example in the cartridge 205 is copied and registered in the RAM 210 to enable the use of character patterns of plural type styles. Consequently the present embodiment allows the use of plural character pattern sets thus copied and registered from plural cartridges, even after the cartridge has been removed or replaced by another cartridge.

In response to the entry of the source ID 301, a step S701 is executed to analyze said source ID and discriminates whether a designated character pattern set ID is present in the supervisor pattern table of the supervisor RAM 211. If absent, the sequence is immediately terminated, since copying is not possible. If the set ID is present, a step S702 analyzes the destination ID 302 when it is entered and discriminates whether the designated character pattern set ID is already present in the supervisor pattern table. If already present, sequence is terminated, since the copying is unnecessary. On the other hand, if it is absent, a copy/registration procedure is conducted in the following manner. First a step S703 determines the leading address of a corresponding character pattern set information portion from the source ID, and calculates a byte length required for the copying, by the following equation:

$$c = l + n \times (h \times (w/8))$$

from said information including the character pattern height (h bits), width (w bits), number n of printer characters in the code system, and length (l bytes) of the character pattern set information portion.

Then a step S704 discriminates whether an unused area of the thus-calculated length is still present in the RAM 210, and, if absent, the program proceeds to a step S707.

On the other hand, if the step S704 identifies that the copying is enabled, a step S705 copies and stores the character pattern set, designated by the source ID, in the unused area in the RAM 210, and replaces the character pattern set ID of thus copied character pattern set by the value of the destination ID. A succeeding step S706 executes a supervisor pattern table renewing routine to record the newly registered character pattern set ID and the leading address of said registration in the supervisor RAM 211 and sets a flag indicating that the newly registered character pattern set is in the RAM. The copying operation of the character pattern set is thus completed.

In a case where the step S704 identifies the absence of an unused area of c bytes in the RAM 210, the program proceeds to a step S707 to transmit an error signal from the CPU 203 to the output buffer 212, in order to inform the host computer 201 of a memory overflow state. Then a step S708 searches the item 603 of the supervisor pattern table, and transmits all the character pattern set ID's 601 of the RAM 210 from the CPU 203 to the host computer 201 through the output buffer 212. In this operation the character pattern set information 501 may be transmitted together with the character pattern set ID 601.

Such overflow check is conducted by dividing the entire memory area into a certain number of blocks, and discriminating the used or unused state of each block by a corresponding unillustrated table. For example, in the registration of a pattern set, the supervisor table corresponding to a newly used memory block is turned on, and, in the deletion of a pattern set, the supervisor table corresponding to the released memory block is turned off.

In the following is explained the sequence of deleting a character pattern set.

Figure 7:
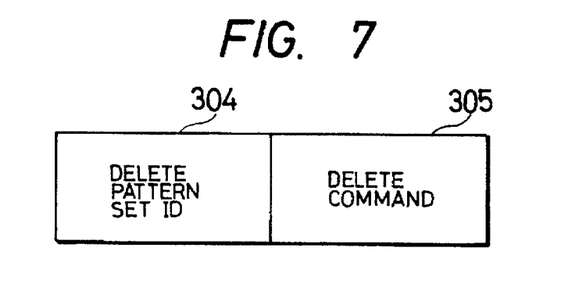
FIG. 7 is a schematic view of a format of a deletion command for a character pattern set in said embodiment.

FIG. 7 shows the format of a deletion command in the present embodiment, which is composed of a deletion pattern set ID number 304 and a deletion command 305.

Figure 8:
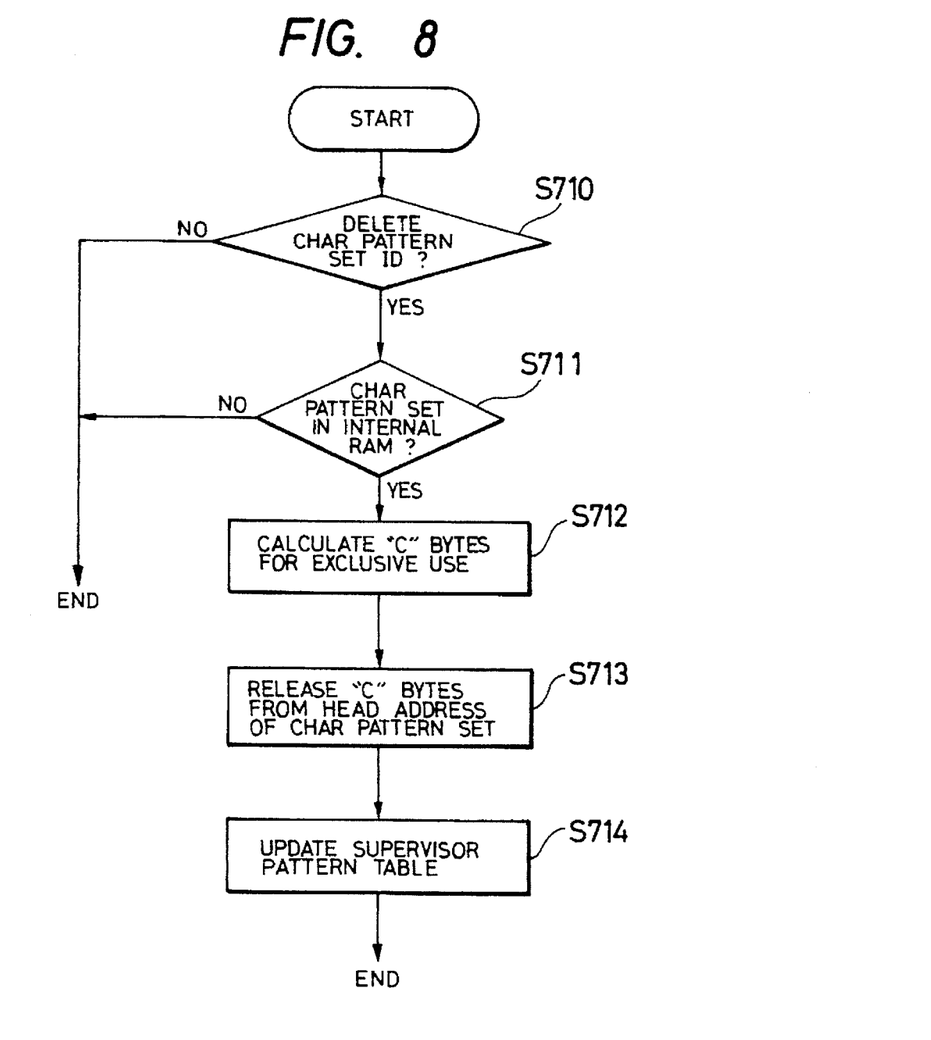
FIG. 8 is a flow chart of a deletion process of a character pattern set in said embodiment.

Now reference is made to FIG. 8 showing a flow chart of a deletion sequence of a character pattern set of the present embodiment.

At first, in response to the entry of a deletion ID 304, a step S710 is executed to analyze the entered deletion ID 304 and discriminates whether a designated character pattern set ID is present in the supervisor pattern table of the supervisor RAM 211. If the ID is absent, the sequence is terminated without the deletion process. On the other hand, if the ID is present, a step S711 refers to the type item 603 to discriminate whether said ID is stored in the RAM. The procedure is continued if storage is made in the RAM but it is terminated otherwise, since the patterns in the cartridge or in the incorporated character generator ROM 204 be deleted. Then a step S712 calculates, in a similar manner to step S703, the byte length by the following equation:

$$c = l + n \times \{h \times (w/8)\}$$

based on the data of the pattern set information portion 501. Then a step S713 deletes data of c bytes determined in the step S712, starting from the pattern set leading address 602, thereby enabling registration of another new pattern. Then a step S714 finally deletes information 601, 602 and 603 of the thus deleted pattern set from the supervisor pattern table.

The deleting sequence is completed in this manner.

When the cartridge 205 is detached, all the information of the character pattern sets for said cartridge is determined from the supervisor pattern table. When a cartridge is mounted, there are registered, on said table, information of the leading address and ID number of each character pattern set stored in said cartridge and a code indicating that said pattern set is a cartridge pattern. Also at the start of power supply, information (leading address, character pattern set ID, etc.) of the incorporated ROM 204 and the cartridge, if amounted, is registered in the supervisor pattern table.

Figure 9:
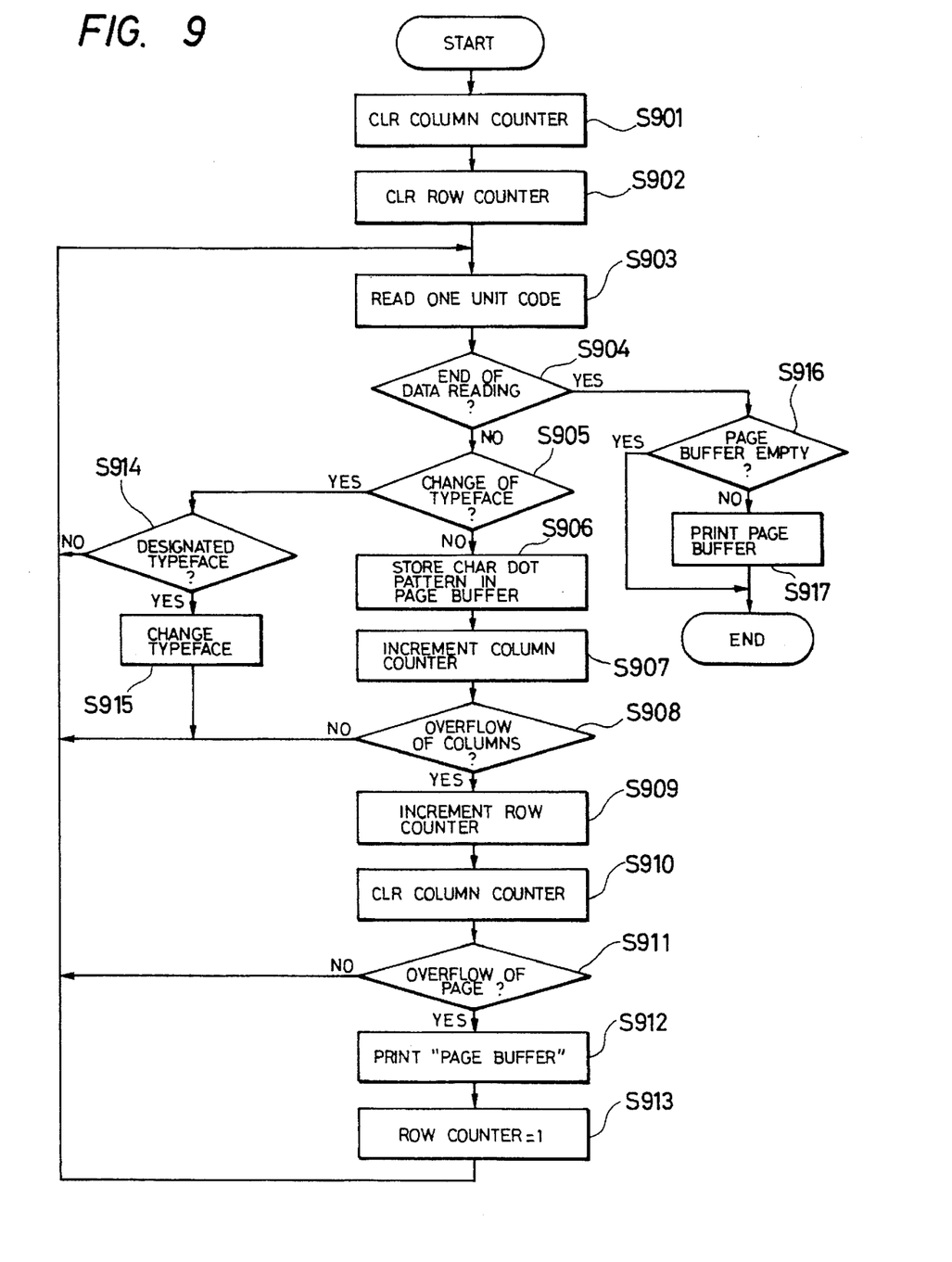
FIG. 9 is a flow chart of a recording operation in said embodiment.

Now reference is made to the flow chart shown in FIG. 9, for explaining the recording operation in the present embodiment.

In steps S901 and S902, the CPU 203 initializes a digit or column counter (not shown) indicating the horizontal recording position and a row counter (not shown) indicating the vertical recording position, and, in a step S903, reads unit code, corresponding to dot pattern of a character, from the input buffer 202. Then a succeeding step S904 discriminates whether the code data reading is completed, and if not, a step S905 discriminates the presence of a command for type style change. If such command is absent, the program proceeds to a step S906 to cause the output page buffer 207 to generate a character dot pattern corresponding to said character code. Said character dot pattern is obtained from a currently designated character pattern set, the properly positioned by the CPU 203 as will be explained later, and stored in is output page buffer 207.

Figure 10:
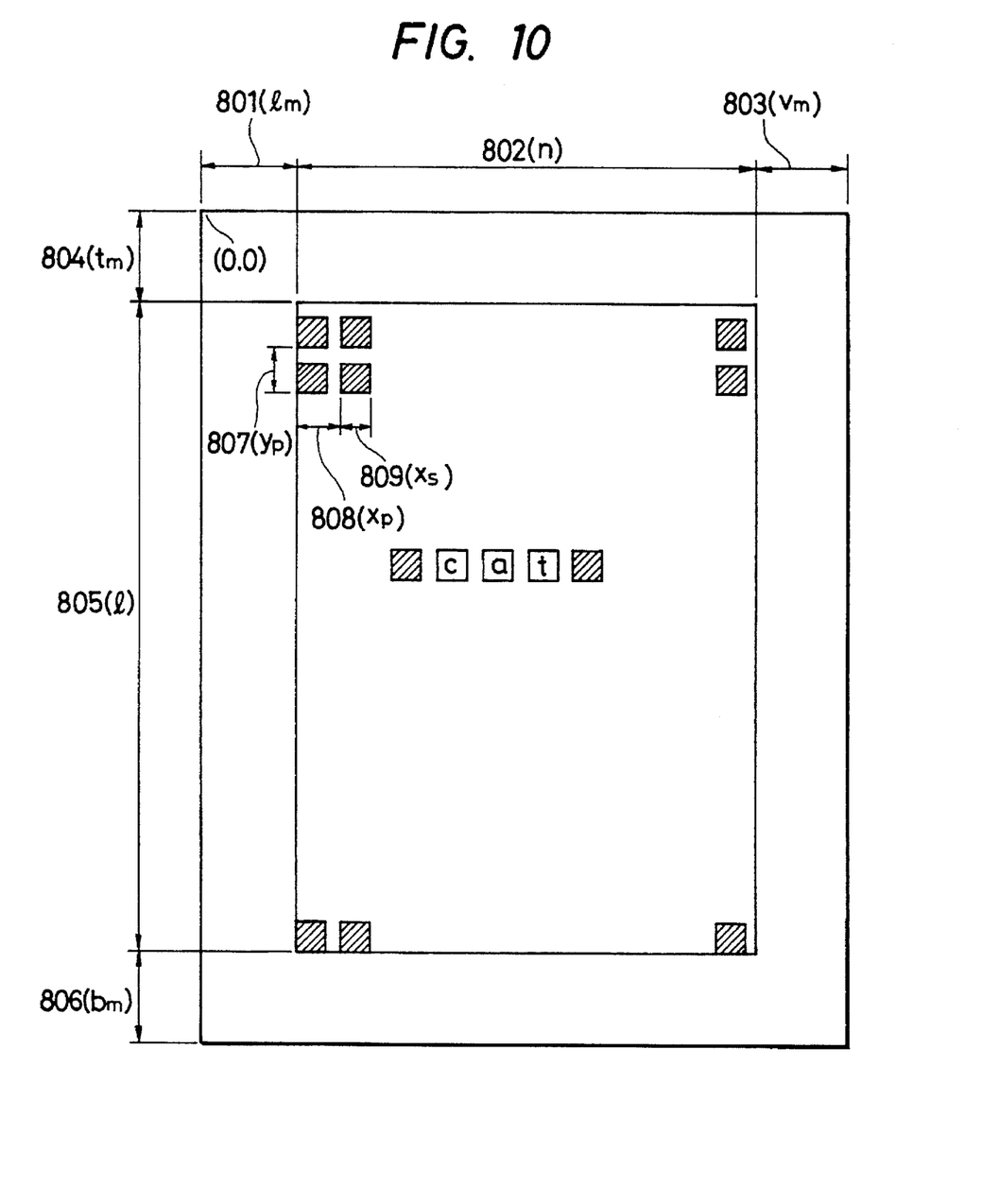
FIG. 10 is a view of an output page buffer in said embodiment.

The positioning of the thus-generated character will be explained in the following, making reference to FIG. 10, showing the content of the output page buffer.

In FIG. 10 there are shown a number of left margin digits (lm) 801, a number of digits of text (n) 802, a number of right margin digits (rm) 803, a number of top margin digits (tm) 804, a number of rows of text (l) 805, a number of bottom margin digits (bm) 806, a number of dots in the row pitch (yp) 807, a number of dots in the character pitch (xp) 808, and a number of dots of the horizontal character width 809.

With the upper left corner of a page as the origin point (0, 0), the value of the digit counter as Xc and the value of the row counter as Yc, the lower right end position $(x_0, y_0)$ of the character dot pattern of a generated character is calculated as:

$$x_0 = lm + (Xc \times xp)$$

$$y_0 = tm + (Yc \times yp)$$

so that the position of the generated character is determined according to the varying values of Xc and Yc.

After a character generation in this manner in the step S906, a succeeding step S907 increases the value of the digit counter by one, and a step S908 checks digit overflow.

If such digit overflow is not present, i.e., if the value of the digit counter is smaller than the number n of digits of the text, the program returns to the step S903 for reading a next unit code.

When the step S908 discriminates that overflow has occurred as the result of charger dot patterns in succession, the program proceeds to a step S909 to increase the value of the row counter by one. Then a step S910 initializes the digit counter, and a step S911 checks page overflow. If page overflow is not present, i.e., the value of the row counter is equal to or smaller than the number l of the rows text, the program returns to the step S903 to continue the preparation procedure of the output page buffer 207.

On the other hand, in a case in which the step S911 discriminates a page overflow state, whereby the preparation of the output page buffer 207 is completed for a page, the dot image is transferred, by a scan line at a time, to the printer interface 208, converted therein into a video signal and supplied to the page printer 209 for achieving image recording thereon (step S912). After the completion of recording, a step S913 sets the row counter to "1". Pages are prepared in succession in this manner, by repeating the sequence from S903 to S913.

However, in a case in which the step S905 discriminates a command for type style change, the program proceeds to a step S914 to discriminate whether the character pattern set ID, contained in said command as a parameter, is present in the supervisor pattern table of the supervisor RAM 211. If present, a step S915 changes the content of a base register in the CPU 203 from the address of a character pattern set so far adopted to the address of a newly designated character pattern set, and the program returns to the step S903. Then the processing of a unit code is initiated to achieve recording with character patterns of a different style.

The recording operation is thus conducted, according to the character code data and the command for type style change. When the step S904 discriminates information indicating the end of data, for example a code indicating the end of a work or the end of a file, the program proceeds to steps S916, S917 to print the data of the output page buffer 207 unless said buffer is empty, i.e., when the value of the row counter is equal to or larger than 2 and the value of the digit counter is equal to or larger than 1, and all the procedure is then terminated.

Figure 11A:
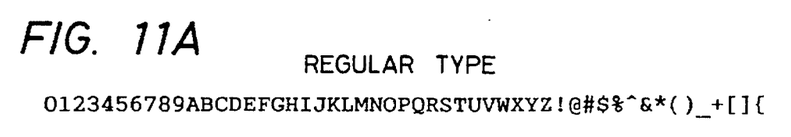
FIGS. 11A to 11C are examples of alphabet type styles.
Figure 11B:
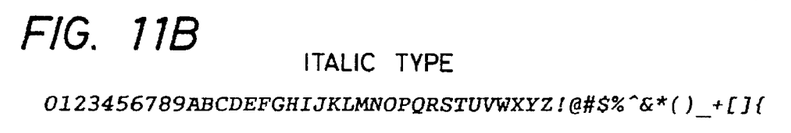
Figure 11C:
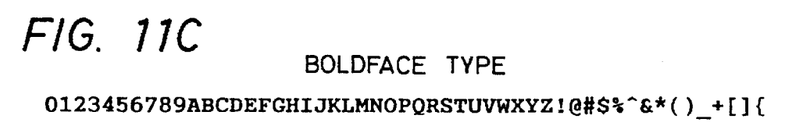

Examples of thus-recorded type styles, such as regular style, Italic style and bold style, are shown in FIGS. 11(a), 11(b) and 11(c).

The type style is changed in various occasions, mostly for emphasizing a part of text for some reason. Particularly the Italic style as shown in FIG. 11(b) or the bold style as shown in FIG. 11(c) is utilized for emphasizing a part of a text. More specifically a change in the type style is conducted by giving a command to the recording apparatus and accordingly changing the addressing of character patterns to a character generator of a designated type style.

Figure 12:
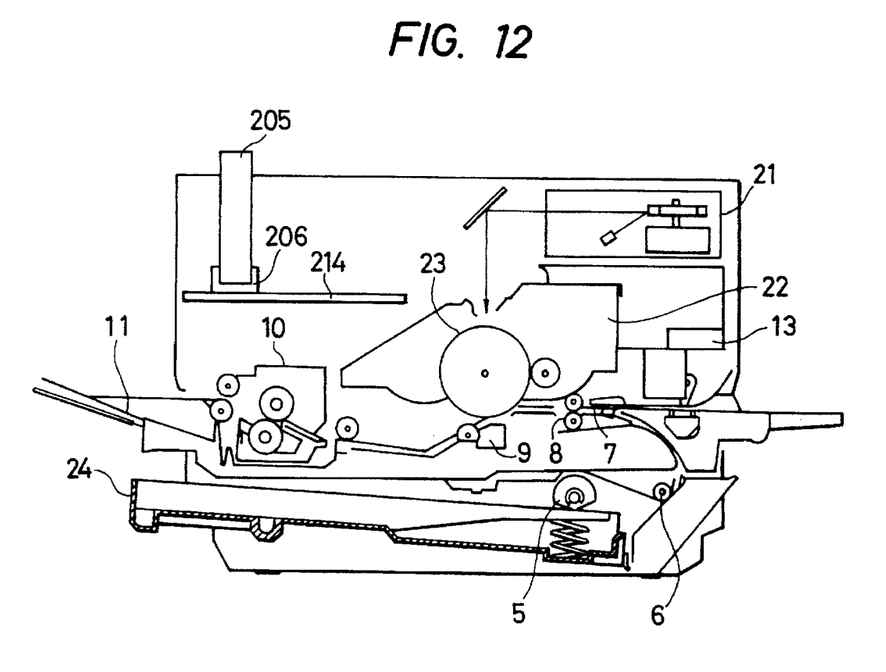
FIG. 12 is a schematic view of a laser beam printer in which the present invention is applicable.

FIG. 12 is a schematic cross-sectional view of a laser beam printer to which the present invention is applicable.

In FIG. 12 there are shown an exposure unit 21 equipped with a scanner and a laser unit; a developing unit 22 for rendering visible a latent image formed on a photosensitive drum 23; a sheet cassette 24; a sheet feed roller 5 for feeding a sheet at a time from the sheet cassette 24 to a transport roller 6; a registration shutter 7 for temporarily stopping a sheet advanced by the transport roller 6 and synchronizing the feeding of said sheet with the laser beam irradiation and the rotation of the photosensitive drum 23; transport rollers 8 for feeding the sheet to an image transfer station 9; a fixing unit 10 for fixing a toner image transferred onto the sheet; and a stacker unit 11 for receiving discharged sheets.

Also there are provided, as already explained before, a detachable character generator 205, a socket 206, and a CPU board 214 on which mounted are the CPU 203, output buffer 207, etc.

In the above-explained laser beam printer, a sequence controller 13 effects timing control of the operations of sheet transport, image development, etc. Said laser beam printer records a visible image on the photosensitive drum 23 by turning on and off the laser beam in response to a video signal released from the printer interface 208.

In the foregoing explanation there has been employed a recording apparatus as a terminal for the output of character patterns, but it is also possible to utilize other output devices such as a cathode ray tube terminal for the output of the character patterns.

The copying and registration of the character pattern set, which has been conducted by a command from the host computer in the foregoing description, can also be achieved for example by an operation key equipped on the recording apparatus.

Also in the foregoing embodiment there have been explained copying and deletion of character dot patterns, but it is naturally possible to effect similar copying and deleting operations on vector patterns such as line section or circle, character codes, and control information such as CR (carriage return), LF (line feed) and FF (form feed). These various data, including patterns, are collectively called pattern data.

The present invention is not limited to the foregoing embodiment but is subject to various modifications and variations within the scope and spirit of the appended claims.

What I claim is:

1. An output apparatus which produces output information on the basis of input information input from an external apparatus and outputs the output information, said apparatus comprising:

connection means for connecting thereto a first external attachable/detachable memory means;

discrimination means for discriminating whether or not information used in producing the output information, read out from the first external memory means connected to said connection means, may be copied in an internal memory means of said output apparatus; and control means for copying, when a discrimination result provided by said discrimination means is positive, the information in the internal memory means, and for informing, when the discrimination result is negative, the external apparatus.

2. An apparatus according to claim 1, wherein the input information comprises a character code and control commands.

3. An apparatus according to claim 1, wherein the output information is dot information and is stored in an output memory means.

4. An apparatus according to claim 1, wherein the information used in producing the output information is a character pattern set.

5. An apparatus according to claim 1, wherein the information used in producing the output information is control information.

6. An apparatus according to claim 1, wherein the copying is instructed by a command from a different apparatus.

7. An apparatus according to claim 1, wherein the copying is instructed by a switch provided on said output apparatus.

8. An apparatus according to claim 1, wherein instruction information for instructing the copying includes identification information for designating information to be copied.

9. An apparatus according to claim 1, wherein said read control means controls the reading by referring to management memory means for managing information available in producing the output information in said output apparatus.

10. An apparatus according to claim 1, wherein said output apparatus is a printer.

11. An output method in an output apparatus equipped with connection means for connecting thereto a first external attachable/detachable memory means, for producing output information on the basis of input information input from an external apparatus and outputting the output information, said method comprising:

a discrimination step of discriminating whether or not information used in producing the output information, read out from the first external memory means connected to the connection means, may be copied in an internal memory means of the output apparatus; and a control step of copying, when a discrimination result in said discrimination step is positive, the information in the internal memory means, and for informing, when the discrimination result is negative, the external apparatus.

12. A method according to claim 11, wherein the input information comprises a character code and control commands.

13. An apparatus according to claim 11, wherein the output information is dot information and is stored in an output memory means.

14. A method according to claim 11, wherein the information used in producing the output information is a character pattern set.

15. A method according to claim 11, wherein the information used in producing the output information is control information.

16. A method according to claim 11, wherein the copying is instructed by a command from a different apparatus.

17. A method according to claim 11, wherein the copying is instructed by a switch provided on the output apparatus.

18. A method according to claim 11, wherein instruction information for instructing the copying includes identification information for designating information to be copied.

19. A method according to claim 11, wherein said read control step includes controlling the reading by referring to management memory means for managing information available in producing the output information in the output apparatus.

20. A method according to claim 11, wherein the output apparatus is a printer.

* * * * *

UNITED STATES PATENT AND TRADEMARK OFFICE
CERTIFICATE OF CORRECTION

PATENT NO. : 5,657,048

DATED : August 12, 1997

INVENTOR(S): HARUO SHIMIZU

It is certified that error appears in the above-identified patent and that said Letters Patent is hereby corrected as shown below:

COLUMN 1

Line 23, "printers" (second occurrence) should read --printers,--.

Line 24, "the" should be deleted.

COLUMN 3

Line 12, "FIG. 1" should read --FIG. 1.--.

Line 25, "following" should read --following,--.

Line 52, "the" (first occurrence) should be deleted.

Line 55, "2" should read --$\ell$--.

COLUMN 4

Line 17, "Consequently" should read --Consequently,--.

Line 31, "the" should be deleted.

UNITED STATES PATENT AND TRADEMARK OFFICE
CERTIFICATE OF CORRECTION

PATENT NO.  :  5,657,048

DATED       :  August 12, 1997

INVENTOR(S) :  HARUO SHIMIZU

It is certified that error appears in the above-identified patent and that said Letters Patent is hereby corrected as shown below:

<u>COLUMN 5</u>

Line 30, "be" should read --cannot be--.

Line 67, "the" should read --is--.

Signed and Sealed this

Seventeenth Day of February, 1998

*Attest:*

BRUCE LEHMAN

*Attesting Officer*     *Commissioner of Patents and Trademarks*